(12) United States Patent
Furukawa et al.

(10) Patent No.: US 9,907,069 B2
(45) Date of Patent: Feb. 27, 2018

(54) COMMUNICATION DEVICE, COMMUNICATION SYSTEM, AND COMMUNICATION METHOD

(71) Applicant: YOKOGAWA ELECTRIC CORPORATION, Musashino-shi, Tokyo (JP)

(72) Inventors: Yota Furukawa, Tokyo (JP); Naoyuki Fujimoto, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 14/385,040

(22) PCT Filed: Mar. 27, 2013

(86) PCT No.: PCT/JP2013/059045
§ 371 (c)(1),
(2) Date: Sep. 12, 2014

(87) PCT Pub. No.: WO2013/146901
PCT Pub. Date: Oct. 3, 2013

(65) Prior Publication Data
US 2015/0049696 A1    Feb. 19, 2015

(30) Foreign Application Priority Data

Mar. 30, 2012  (JP) .................................. 2012-081875
Nov. 30, 2012  (JP) .................................. 2012-262604

(51) Int. Cl.
*H04Q 7/24*   (2006.01)
*H04B 1/00*   (2006.01)
(Continued)

(52) U.S. Cl.
CPC ..... *H04W 72/0446* (2013.01); *H04W 72/046* (2013.01); *H04W 72/0426* (2013.01);
(Continued)

(58) Field of Classification Search
CPC . H04W 72/0446; H04W 40/06; H04W 88/04; H04W 72/0453; H04W 72/046;
(Continued)

(56) References Cited

U.S. PATENT DOCUMENTS 6,151,310 A * 11/2000 Dent ............................ 370/330
7,130,586 B2 * 10/2006 Corbett .................. H01Q 1/242
455/456.1
(Continued)

FOREIGN PATENT DOCUMENTS

CN        101267238 A     9/2008
CN        101741444 A     6/2010
(Continued)

OTHER PUBLICATIONS

International Search Report for PCT/JP2013/059045 dated May 21, 2013.

*Primary Examiner* — Edan Orgad
*Assistant Examiner* — Vanneilian Lalchinthang
(74) *Attorney, Agent, or Firm* — Sughrue Mion, PLLC

(57) ABSTRACT

This communication device that can, for each timeslot, switch the communication partner for performing wireless communication, is characterized by being provided with: a plurality of antennas including at least one directional antenna; at least one communication circuit that transmits/receives a signal with the communication partner using the antennas; and a control unit that allocates the communication circuit and the antennas used in wireless communication on a timeslot-by-timeslot basis.

9 Claims, 12 Drawing Sheets

(51) Int. Cl.
*H04B 15/00* (2006.01)
*H04W 72/04* (2009.01)
*H04W 16/28* (2009.01)
*H04W 40/06* (2009.01)
*H04W 88/04* (2009.01)

(52) U.S. Cl.
CPC ........ *H04W 72/0453* (2013.01); *H04W 16/28* (2013.01); *H04W 40/06* (2013.01); *H04W 88/04* (2013.01); *Y02B 60/50* (2013.01)

(58) Field of Classification Search
CPC . H04W 72/04; H04W 72/0426; H04W 16/28; H04B 7/26; Y02B 60/50
USPC ........................................................ 370/329
See application file for complete search history.

(56) References Cited

U.S. PATENT DOCUMENTS

| | | | |
|---|---|---|---|
| 7,420,980 B1 | 9/2008 | Pister et al. | |
| 7,701,858 B2 * | 4/2010 | Werb et al. | 370/241 |
| 2001/0043613 A1 * | 11/2001 | Wibowo | H04J 3/1682 370/468 |
| 2003/0193908 A1 * | 10/2003 | Cain | 370/330 |
| 2003/0193919 A1 | 10/2003 | Cain et al. | |
| 2004/0028018 A1 * | 2/2004 | Cain | H04B 7/2643 370/338 |
| 2006/0270343 A1 * | 11/2006 | Cha et al. | 455/25 |
| 2008/0227497 A1 | 9/2008 | Stirling-Gallacher et al. | |
| 2010/0009638 A1 * | 1/2010 | Saito | H01Q 1/2258 455/73 |
| 2010/0109843 A1 | 5/2010 | Sugaya | |
| 2011/0039494 A1 | 2/2011 | Shon et al. | |
| 2011/0187490 A1 * | 8/2011 | Nakamoto et al. | 340/3.9 |
| 2012/0052812 A1 | 3/2012 | Frei | |
| 2013/0227575 A1 * | 8/2013 | Jensen et al. | 718/102 |

FOREIGN PATENT DOCUMENTS

| | | |
|---|---|---|
| CN | 101997575 A | 3/2011 |
| JP | 2006-522547 A | 9/2006 |
| JP | 2008-536406 A | 9/2008 |
| JP | 2011-103520 A | 5/2011 |
| WO | 03096710 A2 | 11/2003 |
| WO | 2004/084614 A2 | 10/2004 |
| WO | 2006/110737 A2 | 10/2006 |
| WO | 2008087592 A2 | 7/2008 |

* cited by examiner

*FIG. 5*

| Index | NEIGHBOR DEVICE | ANTENNA NUMBER |
|---|---|---|
| 1 | A | 1 |
| 2 | B | 1 |
| 3 | C | 2 |
| 4 | D | 2 |

| SUPERFRAME NUMBER | ANTENNA NUMBER |
|---|---|
| 1 | 1 |
| 2 | 2 |
| 3 | 1 |

| DEVICE | DEVICE NUMBER | FIRST ANTENNA | SECOND ANTENNA |
|---|---|---|---|
| WIRELESS FIELD DEVICE A | 1 | 4 | — |
| WIRELESS FIELD DEVICE B | 2 | 4 | — |
| WIRELESS FIELD DEVICE C | 3 | 4 | — |
| WIRELESS FIELD DEVICE R | 4 | 1,2 | 3,5 |
| SYSTEM MANAGEMENT DEVICE D | 5 | 4 | — |

COMMUNICATION DEVICE, COMMUNICATION SYSTEM, AND COMMUNICATION METHOD

TECHNICAL FIELD

The present invention relates to a communication device, a communication system, and a communication method.

Priority is claimed on Japanese Patent Application No. 2012-081875, filed Mar. 30, 2012, and Japanese Patent Application No. 2012-262604, filed Nov. 30, 2012, the contents of which are incorporated herein by reference.

BACKGROUND ART

A wireless communication system compliant with wireless communication standard ISA 100.11a (wireless communication standard for industrial automation) developed by the International Society of Automation (ISA) and a wireless communication system compliant with WirelessHART (Registered Trademark) are known as industrial wireless communication systems. Each of these wireless communication systems uses slot hopping to achieve highly reliable wireless communication.

In slot hopping, the frequency channels and time slots in wireless communications between communication nodes are defined individually, thereby preventing interference and achieving highly reliable wireless communication. In a wireless communication system using slot hopping, the communication nodes share a hopping table that stipulates the frequency channels and time slots between the individual communication nodes, and the time slots and frequency hopping in wireless communication between the communication nodes are thereby managed collectively. Such a wireless communication system has been disclosed in detail in the US patents and Japanese patents listed below, and in the ISA100.11a standard, etc.

PRIOR ART DOCUMENTS

Patent Documents

[Patent Document 1] U.S. Pat. No. 7,701,858
[Patent Document 2] U.S. Pat. No. 7,420,980
[Patent Document 3] Japanese Unexamined Patent Application, First Publication No. 2011-103520

DISCLOSURE OF INVENTION

Problems to be Solved by the Invention

While most of these wireless communication systems are constructed at plants and factories, recently they are also being constructed outside plants and the like. For example, they are sometimes constructed along pipelines carrying oil, natural gas, or the like, or around oil fields. While most wireless communication systems constructed in plants and the like need only be capable of long-distance communication of a maximum of approximately several km, wireless communication systems constructed outside plants and the like sometimes need to be capable of long-distance communication of more than approximately tens of km.

As methods of realizing long-distance communication with the wireless communication system described above, there is a first method that uses multi-hop communication for hopping (relaying) information between a plurality of communication nodes, and a second method that uses directional antennas. In the first method, for example, information transmitted from communication node A to communication node B is transmitted (hopped) from communication node B to communication node C, thereby achieving long-distance communication from communication node A to communication node C. In contrast, in the second method, the wave propagation distance is increased by providing directional antennas, such as Yagi-Uda antennas, at communication nodes A and C, thereby achieving long-distance communication from communication node A to communication node C without going via communication node B.

However, in attempting to achieve long-distance communication using the first method described above, since the number of hops (the number of times information is hopped) is high in proportion to the communication distance, the number of communication nodes increases as the communication distance increases, leading to problems of higher cost (including installation cost and maintenance cost) and longer time needed to perform the communication. In the second method described above, the output (wireless output) must be increased in accordance with the communication distance between the two communication nodes (in this example, communication nodes A and C), and, if there are legal restrictions on the output, the communication distance between the two communication nodes is limited, leading to a problem of limited long-distance communication when using only the two communication nodes.

As the scale of the wireless communication system described increases, there are cases where there is a need for various types of communication, and not only long-distance communication between two communication nodes that are simply separated. In the example of the wireless communication system mentioned above, which is constructed along a pipeline and has three communication nodes A, B, and C, communication node 13 relays information from communication node A to communication node C while also transmitting information obtained at communication node B to communication node C.

The present invention provides a communication device, a communication system, and a communication method that achieve long-distance communication and various types of communication, while greatly suppressing a rise in cost.

Means for Solving the Problems

A communication device in accordance with a preferred embodiment of the present invention is capable of switching communication partners that perform wireless communication in each time slot, and includes: a plurality of antennas including one or more directional antennas; one or more communication circuits that uses the antennas to transmit and receive signals to and from the communication partners; and a control unit that allocates antennas and communication circuits used in the wireless communication, with the time slots as a reference.

The communication device may further include: a selection circuit that selects one antenna to be connected to the one communication circuit provided for the plurality of antennas; the control unit controls the selection circuit with the time slots as a reference, and thereby allocates an antenna to be used in wireless communication.

The communication device may include one or more the communication circuit provided in a one-to-one correspondence with one of the plurality of antennas, and wherein the control unit controls whether or not to operate the communication circuits with the time slot as a reference, and thereby an antenna and a communication circuit to be used in wireless communication.

The control unit may switch channels by controlling the communication circuit used in wireless communication with the time slot as a reference.

The control unit may allocate an antenna and a communication circuit to be used in wireless communication based on antenna specification information specified that the antenna specifies for each communication link or each communication partner.

The control unit may allocate an antenna and a communication circuit to be used in wireless communication based on a superframe that stipulates at least each communication partner and circuit time.

The time slot allocation information or the time slot and channel allocation information may be acquired from an external unit.

The communication device may further include a measurement unit that measures a specific physical quantity or a manipulation unit that manipulates the specific physical quantity, wherein the communication device is a field device that wirelessly transmits measurement data of the measurement unit to a communication partner, or wirelessly receive manipulation data of the manipulation unit from a communication partner.

The communication device may have a primary battery, a secondary battery, or an environmental battery as its power source.

The communication device may perform wireless communication compliant with ISA100.11a (wireless communication standard for industrial automation).

The communication circuit may transmit information for allowing a new communication device to join a wireless network that the self device belongs to as an advertisement, and the control unit may make the communication circuit transmit a different type of the advertisement for each antenna that was selected by controlling the selection circuit.

A communication system in accordance with a preferred embodiment of the present invention includes a plurality of the communication devices described above, provided within a range where wireless communication is possible.

The communication system may further include a system management device that supplies the time slot allocation information or the time slot and channel allocation information to each of the communication devices.

The communication system may include a terminal device capable of setting information indicating the communication partners of each of the antennas in each communication device, and wherein, based on information set by the terminal device, the system management device may create information for allocating an antenna and communication circuit that each communication device uses in wireless communication.

A communication system in accordance with a preferred embodiment of the present invention is capable of performing wireless communication via a wireless network, and includes one or more the above communication devices, the communication device belonging to the wireless network.

The communication system may further include a system management device that manages time slots for making the communication device transmit a different type of the advertisement for each of the antennas.

A communication method in accordance with a preferred embodiment of the present invention is performing wireless communication with time slots as a reference, and includes: an antenna selection step of selecting one of a plurality of antennas including at least a directional antenna; and a communication step of transmitting and receiving signals using an antenna that was selected in the antenna selection step.

A communication method in accordance with a preferred embodiment of the present invention is performing wireless communication via a wireless network with time slots as a reference, and includes: an advertisement transmission step of switching a plurality of antennas including at least a directional antenna, while transmitting a different type of advertisement to each of the antennas, with the time slots as a reference; and a wireless communication step of performing wireless communication with a communication device that has joined the wireless network using the advertisement.

Effects of the Invention

According to a preferred embodiment of the present invention, wireless communication is performed by an antenna and a communication circuit allocated by a control unit with the time slot as a reference from among a plurality of antennas including at least directional antennas and at least one communication circuit, and multi-hop communication is achieved using the directional antenna. It is therefore possible to achieve long-distance communication and various types of communication, while greatly suppressing a rise in cost.

BRIEF DESCRIPTION OF THE DRAWINGS

FIG. 5 is a conceptual diagram illustrating a configuration of a neighbor table in accordance with the first preferred embodiment of the present invention;

EMBODIMENTS FOR CARRYING OUT THE INVENTION

A communication device, a communication system, and a communication method in accordance with preferred embodiments of the present invention will be explained in detail with reference to the drawings.

First Preferred Embodiment (Configuration of Wireless Measurement System)

Figure 1:
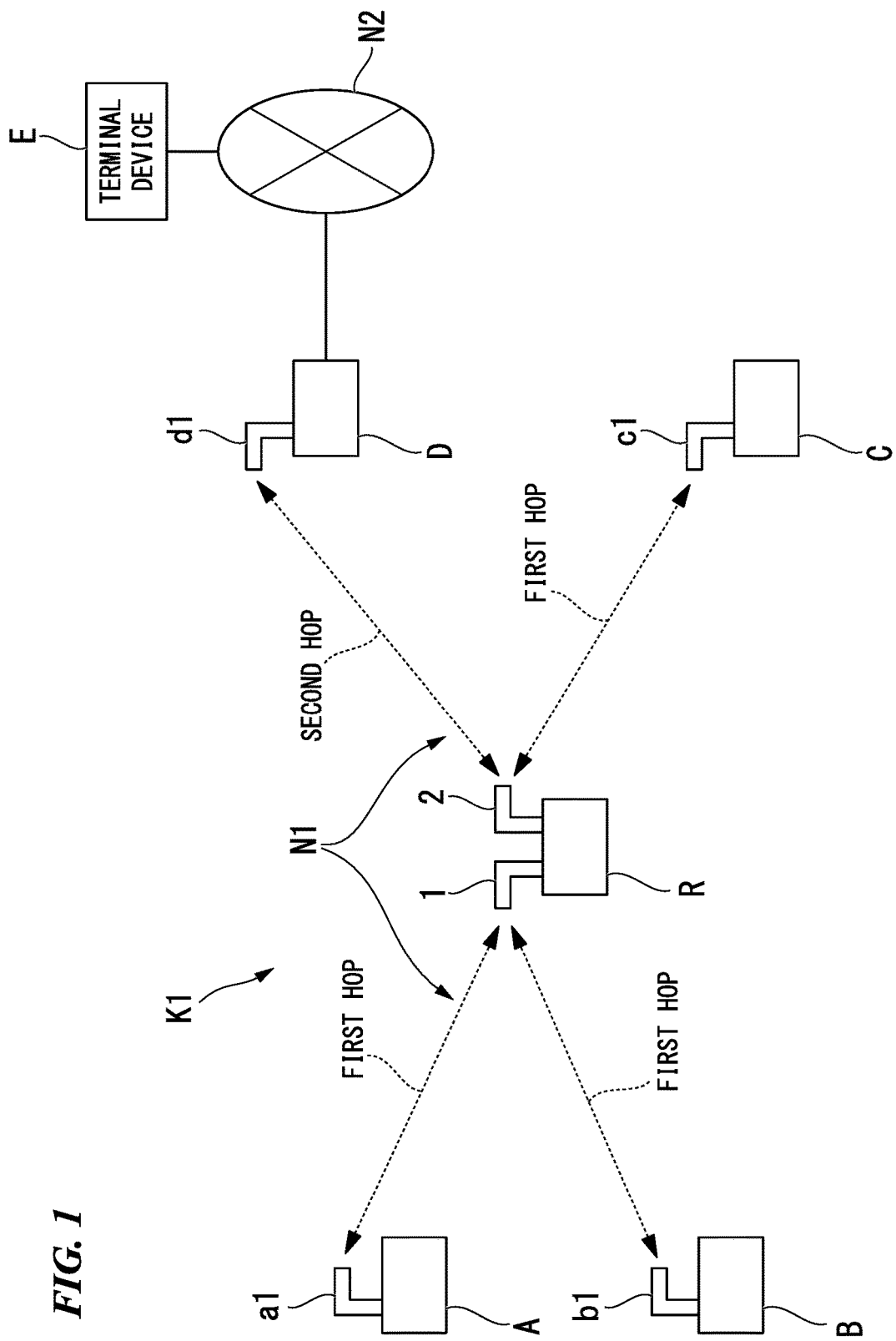
FIG. 1 is a system configuration diagram illustrating an actual wireless measurement system K1 (communication system) in accordance with a first preferred embodiment of the present invention.

As shown in FIG. 1, a wireless measurement system K1 in accordance with a first preferred embodiment includes four wireless field devices A to C and R, a system management device D, and a terminal device E, and constitutes a wireless communication system compliant with one of the wireless communication standards for industrial automation, e.g. ISA100.11a. That is, the measurement system K1 is a wireless communication system in which the system management device D and the wireless field devices A to C and R functioning as wireless communication devices use a hopping table, a superframe, and such like (described later), and thereby performs synchronous communications at predetermined time intervals via a wireless network N1.

This wireless measurement system K1 is provided at various types of plant, such as oil plants, various types of chemical plants or power plants. The wireless measurement system K1 makes the system management device D collect measurement data for types of process quantities relating to the plant, such as pressure, flow volume and/or temperature, measured by the wireless field devices A to C and R, and then supplies them from the system management device D via a wired network N2 to an upper-level plant control system (not shown).

The wireless field devices A to C and R are some of a plurality of wireless field devices constituting the wireless measurement system K1. For sake of convenience, FIG. 1 shows just some of the wireless field devices constituting the actual wireless measurement system K1, whereas the actual wireless measurement system K1 includes a great many wireless field devices, among which are the four wireless field devices A to C and R.

To keep power consumption low, the normal operation mode of the wireless field devices A to C and R is a low-power mode, and by shifting from this low-power mode to a measurement mode at a predetermined interval, they measure the process quantities and transmit them to the system management device D. Of these four wireless field devices A to C and R, the wireless field device R (field device with relay function) is a characteristic communication device of the first preferred embodiment, and includes a relay function for multi-hop communication between the other wireless field devices A to C and the system management device D.

The wireless field device R also includes an advertisement-transmitting function of transmitting an advertisement packet (advertisement) containing information for allowing a new wireless field device to join the wireless network N1 that the wireless field device R itself belongs to. When a new wireless field device uses an advertisement packet and attempts to join the wireless network N1, the wireless field device R relays various signals that the new wireless field device and the system management device D transmit and receive to/from each other.

For sake of convenience, FIG. 1 shows a state where there is one wireless field device R (field device with relay function) between the other wireless field devices A to C and the system management device D. However, there are cases where an actual wireless measurement system K1 includes a plurality of wireless field devices R (field devices with relay function) arranged in series between the other wireless field devices A to C and the system management device D. In the wireless measurement system K1 shown in FIG. 1, only the wireless field device R can communicate directly with the system management device D, while the wireless field devices A to C perform indirect wireless communication with the system management device D, using the wireless field device R as a relay station.

As shown in FIG. 1, of the three wireless field devices A to C, two wireless field devices A and B are provided on the left side of the wireless field device R which has the relay function described above, within a range (position) that enables wireless communication with the wireless field device R. The remaining wireless field device C and the system management device D are provided on the right side of the wireless field device R within a range (position) that enables wireless communication with the wireless field device R.

The system management device D executes overall management of the wireless field devices A to C and R, collects measurement data received from each of them, and supplies this data to an upper-level plant control system. Specifically, based on information set by the terminal device E, the system management device D creates various types of tables such as a hopping table and a superframe (information for allocating antennas and the like that the wireless field devices A to C and R use in wireless communication), as will be described below, and uses these tables and the superframes to execute overall management of the wireless field devices A to C and R. The method used for creating the tables and the superframes will be explained below.

The terminal device E is connected to the system management device D via a wired network N2, is manipulated by, for example, a manager (system manger) of the wireless measurement system K1, and performs settings (e.g. settings of information that the system management device D needs to create the tables and superframes) and the like in accordance with the manipulation executed by the system manager. The terminal device E is realized by a personal computer or a work station that includes, for example, an input device such as a keyboard and a pointing device, a display device such as a liquid crystal display device, etc. The terminal device E and the system management device D can be stored inside a single casing.

(Configuration of Wireless Field Device R)

Figure 2:
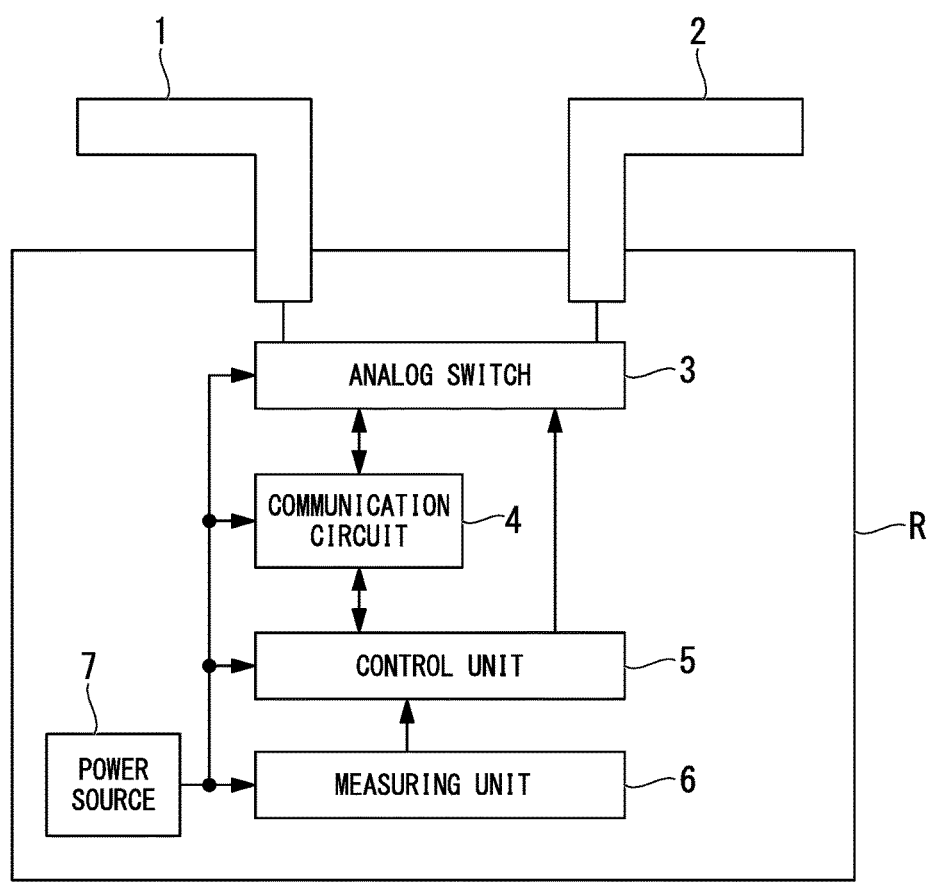
FIG. 2 is a block diagram illustrating a functional configuration of a wireless field device R (communication device) in accordance with the first preferred embodiment of the present invention.

The configuration of the wireless field device R will be explained in more detail with reference to FIG. 2. The wireless field device R is a communication device for realizing multi-hop communication using a directional antenna within a range defined by the ISA100.11a standard, and its communication partners are the three wireless field devices A to C and the system management device D. As shown in FIG. 2, the wireless field device R includes, as its functional constitutive elements, a first directional antenna 1, a second directional antenna 2, an analog switch 3 (selection circuit), a communication circuit 4, a control unit 5, a measuring unit 6, and a power source 7.

The first directional antenna 1 receives, with a high degree of sensitivity, radio waves radiated from a specific direction, and radiates high-intensity waves in the specific direction, e.g. it is a Yagi-Uda antenna. As shown in FIG. 1, the specific direction of the first directional antenna 1 is set to the direction (left direction) of the wireless field devices A and B such that wireless communication becomes possible between them.

Like the first directional antenna 1, the second directional antenna 2 has high reception sensitivity to waves radiated the specific direction and radiates high-intensity waves in the specific direction, e.g. it is a Yagi-Uda antenna. As shown in FIG. 1, the specific direction of the second directional antenna 2 is set to the direction (right direction) of the wireless field device C and the system management device D such that wireless communication becomes possible between them.

The analog switch 3 is a selection circuit that, based on a selection signal input from the control unit 5, alternatively selects one of the first and second directional antennas 1 and 2 and connects it to the I/O terminal of the communication circuit 4. That is, the analog switch 3 supplies a transmission signal input from the communication circuit 4 to one of the first and second directional antennas 1 and 2. The analog switch 3 supplies one of a signal of the reception wave captured by the first directional antenna 1 (reception signal) and a signal of the reception wave captured by the second directional antenna 2 to the communication circuit 4.

The communication circuit 4 includes a transmission circuit and a reception circuit. Based on information (transmission information) input from the control unit 5, the communication circuit 4 outputs a transmission signal created by the transmission circuit to the analog switch 3. The communication circuit 4 extracts the information (reception information) contained in reception signal input from the analog switch 3 by subjecting the reception signal to a reception process in the reception circuit, and outputs to the control unit 5. Under the control of the control unit 5, the communication circuit 4 can additionally transmit an advertisement packet (advertisement) containing information for allowing a new wireless field device to join the wireless network N1 that the communication circuit 4 belongs to.

Based on a predetermined control program, the control unit 5 uses software to control each unit of the wireless field device R. The control unit 5 includes a non-volatile memory that the control program is stored in, a central processing unit (CPU) that executes the control program mentioned above, an interface circuit for enabling the CPU to transmit and receive signals to and from the communication circuit 4 and the measuring unit 6, an internal bus that interconnects the non-volatile memory, the CPU, and the interface circuit such that communication is possible between them, and such like.

Figures 3, 4:
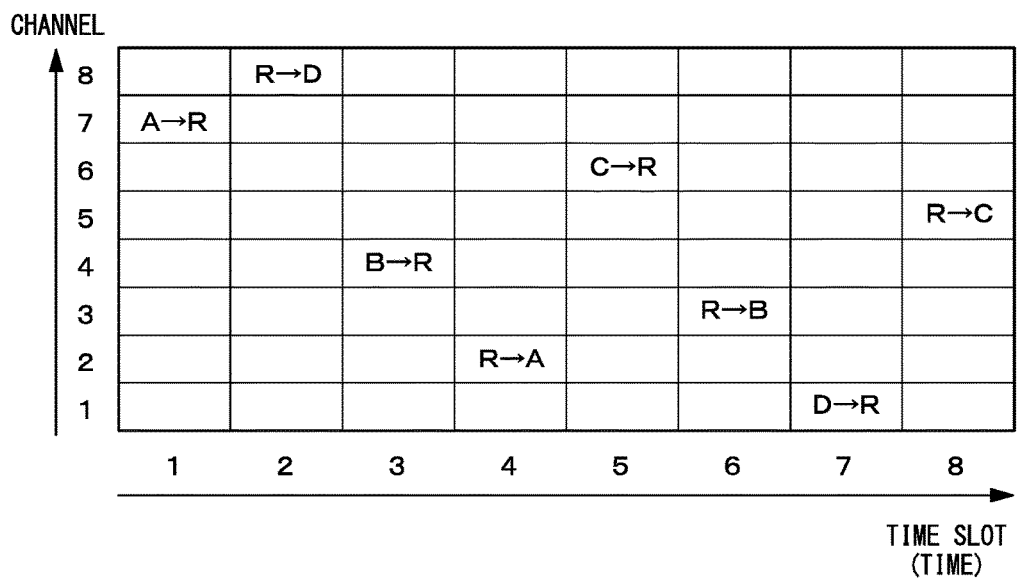
FIG. 3 is a conceptual diagram illustrating a configuration of a hopping table in accordance with the first preferred embodiment of the present invention.
FIG. 4 is a conceptual diagram illustrating a configuration of a link table in accordance with the first preferred embodiment of the present invention.

The control unit 5 stores a hopping table shown in FIG. 3 as one type of control information to perform wireless communication compliant with ISA100.11a between the other wireless field devices A to C and the system management device D. This hopping table stipulates the time slot and channel (frequency channel) hopping for each communication link between the communication devices that constitute the wireless measurement system K1, i.e. it individually allocates a time slot and a channel for each communication link between the four wireless field devices A to C and R and the communication circuit 4.

For example, the first time slot after the start of communication (time slot 1) and channel 7 are allocated to the communication link (A→R) from the wireless field device A to the wireless field device R, while time slot 4 and channel 2 are allocated to the communication link in the reverse direction of this communication link (A→R), i.e. the communication link (R→A) from the wireless field device R to the wireless field device A. Time slot 5 and channel 6 are allocated to the communication link (C→R) from the wireless field device C to the wireless field device R, while time slot 8 and channel 5 are allocated to the communication link in the reverse direction of this communication link (C→R), i.e. the communication link (R→C) from the wireless field device R to the wireless field device C.

By allocating different time slots and channels to the communication links in this manner, ISA100.11a achieves the high reliability demanded by industrial wireless communication. The hopping table shown in FIG. 3 shows only some of the time slots and channels that can be allocated. Such a hopping table is created by the system management device D based on information set by the terminal device E, and the hopping table created by the system management device D is acquired (downloaded) by the wireless field device R and thus stored in the control unit 5.

In addition to the hopping table compliant with ISA100.11a, the control unit 5 also stores a link table, shown in FIG. 4, as control information. As shown in FIG. 4, the link table stipulates an antenna number (antenna specification information) for each communication link that the wireless field device R (field device with relay function) engages with. The antenna numbers are identification numbers of the first and second directional antennas 1 and 2 described above. In FIG. 4, antenna number '1' indicates the first directional antenna 1, and antenna number '2' indicates the second directional antenna 2. Like the hopping table shown in FIG. 3, the link table shown in FIG. 4 is created by the system management device D based on information set by the terminal device E, and the link table created by the system management device D is acquired (downloaded) by the wireless field device R and thus stored in the control unit 5.

As an alternative to the link table, the control unit 5 also stores a neighbor table, shown in FIG. 5. The neighbor table stipulates antenna numbers similar to those in the link table described above for each of the communication partners of the wireless field device R (field device with relay function), i.e. to each of the three wireless field devices A to C and the system management device D. In FIG. 5, antenna number '1' is allocated to the two wireless field devices A and B, which are neighbor devices, and antenna number '2' is allocated to the wireless field device C and the system management device D, which are also neighbor devices. Like the hopping table shown in FIG. 3 and the link table shown in FIG. 4, the neighbor table is created by the system management device D based on information set by the terminal device E, and the link table created by the system management device D is acquired (downloaded) by the wireless field device R and thus stored in the control unit 5.

Figures 6A, 6B:
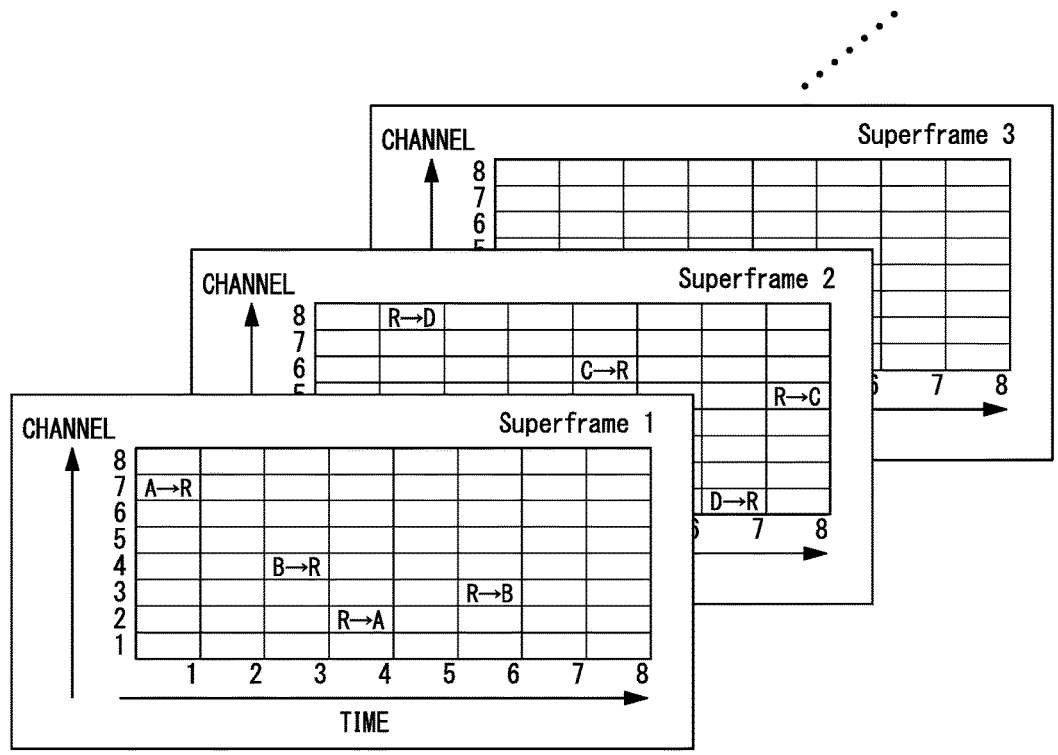
FIG. 6A is a conceptual diagram illustrating a superframe in accordance with the first preferred embodiment of the present invention.
FIG. 6B is a conceptual diagram illustrating a superframe in accordance with the first preferred embodiment of the present invention.

Moreover, as an alternative to the link table and the neighbor table, the control unit 5 stores a plurality of superframes such as those shown in FIG. 6A as control information. A superframe is a communication template used for expressing, for example, a fixed-interval repeat stipulated by ISA100.11a, and includes the table of FIG. 3 with hopping stipulated up to, for example, 6,400 time slots. That is, the superframe stipulates the time slots (communication times) and channels (communication frequencies) for actual communication with a communication partner within a predetermined time (e.g. a time equivalent to 6,400 time slots). Each wireless communication device constituting the wireless measurement system K1 initially receives and stores a superframe, which the system management device D has created based on information set by the system management device D.

A priority is allocated beforehand to each of the plurality of superframes stored in the wireless communication devices constituting the wireless measurement system K1. For example, in FIG. 6A the highest priority is allocated to 'superframe 1' (the superframe with a superframe number of '1'), the next highest priority is allocated to 'superframe 2' (the superframe with a superframe number of '2'), and the lowest priority is allocated to superframe '3' (the superframe with a superframe number of '3'). If there is any interference between the communication links (time slots and channels) allocated to the plurality of superframes, the control unit 5 refers to the priority allocated to the superframe, and uses the communication link which has the superframe with the highest priority allocated thereto.

Here, 'superframe 1' stipulates communication between the wireless field device R and the wireless field device A or the wireless field device B, and 'superframe 2' stipulates communication between the wireless field device R and the wireless field device C or the system management device D. When communicating with the wireless field device A or the wireless field device B, the wireless field device R selects and uses 'superframe 1', and when communicating with the wireless field device C or the system management device D, it selects and uses 'superframe 2'.

Together with the superframes shown in FIG. 6A, the control unit 5 also stores the table shown in FIG. 6B. This table stipulates the antennas used for each superframe, the superframe number of each superframe being listed in correspondence with an antenna number. In the example of FIG. 6B, antenna number '1' is allocated to the superframe numbers '1' and '3', while antenna number '2' is allocated to superframe number '2'.

Therefore, when performing wireless communication along the communication links allocated to 'superframe 1' (A→R, B→R, R→A, R→B), the control unit 5 executes control such that the wireless communication is performed using the first directional antenna 1 which has an antenna number of '1'. Whereas, when performing wireless communication along the communication links allocated to 'superframe 2' (R→D, C→R, D→R, R→C), the control unit 5 executes control such that the wireless communication is performed using the second directional antenna 2 which has an antenna number of '2'.

The control unit 5 combines the hopping table described above with one of a link table, a neighbor table, and a superframe, creates a selection signal that specifies one of the first directional antenna 1 or the second directional antenna 2 for the communication partners (the three wireless field devices A to C and the system management device D), and outputs this selection signal to the analog switch 3. When using a superframe, the control unit 5 selects one of the plurality of superframes, refers to the table shown in FIG. 6B, acquires the antenna number that corresponds to the superframe number allocated to the selected superframe, and makes the analog switch 3 select the antenna specified by that antenna number. Thus the control unit 5 controls the analog switch 3 by using superframes and the various tables such as the hopping table with the time slots as a reference, and thereby allocates antennas for use in wireless communication.

The control unit 5 also stores a route table (not shown) relating to the wireless field devices and the system management device D that constitute the wireless measurement system K1, and includes a function for specifying a communication path based on this route table.

In addition, the control unit 5 executes control to make the communication circuit 4 transmit different types of advertisement packets to each of the first and second directional antennas 1 and 2 (to each antenna selected by controlling the analog switch 3). The purpose of executing such control is to allow a new wireless field device to join the wireless network N1 even when the new device is arranged on one of the left-side and the right-side of the wireless field device R shown in FIG. 1 (when performing wireless communication with the wireless field device R via one of the first and second directional antennas 1 and 2). To execute the control described above, the control unit 5 stores a superframe for use in transmitting an advertisement packet such as that shown in FIG. 7 (a superframe with a superframe number of 'X') as one the abovementioned superframe types.

Figures 7, 8:
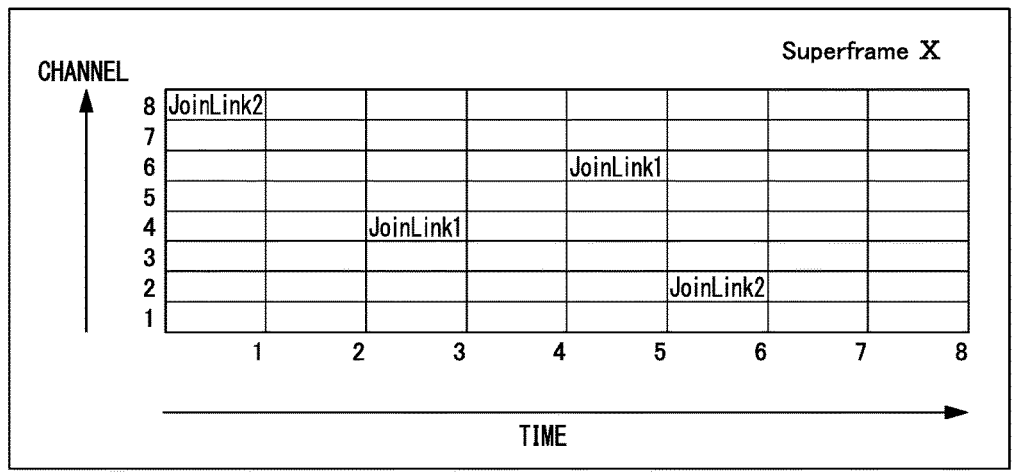
FIG. 7 is a conceptual diagram illustrating a superframe for use in transmitting an advertisement packet in accordance with the first preferred embodiment of the present invention.
FIG. 8 is a diagram illustrating an example of information set to a terminal device E in accordance with the first preferred embodiment of the present invention.

The advertisement packet transmitted from the wireless field device R contains time information indicating the time when managed by the wireless field device R, and information indicating a join link for transmitting a join request, which is a request to join the wireless network N1. As shown in FIG. 7, the control unit 5 transmits an advertisement packet containing information for 'join link 1' from the first directional antenna 1, and transmits an advertisement packet containing information for 'join link 2' from the second directional antenna 2. The 'join link 1' is a communication link set such that the join request (a join request transmitted from a new wireless field device attempting to join the wireless network N1) is received by the first directional antenna 1, and 'join link 2' is a communication link set such that the join request is received by the second directional antenna 2.

Specifically, as shown in the example of FIG. 7, the advertisement packet containing the information for 'join link 1' (the advertisement packet for transmission from the first directional antenna 1) is allocated to time slot 3 and channel 4, and to time slot 5 and channel 6. In contrast, the advertisement packet containing the information for 'join link 2' (the advertisement packet for transmission from the first directional antenna 2) is allocated to time slot 1 and channel 8, and to time slot 6 and channel 2. While FIG. 7 shows an example where an advertisement packet is allocated to every link, the advertisement packets can be allocated in superframe units, as in the example of FIGS. 6A and 6B.

The measuring unit 6 is a functional constitutive element for measuring various process quantities relating to the plant, and outputs measurement data to the control unit 5. The measuring unit 6 measures the process quantities based on various measuring principles, e.g. a pressure gauge for measuring the pressure of a fluid based on the difference in pressure at the front and rear of an orifice provided in a piping, a flow meter for measuring the mass flow rate of a fluid based on the Coriolis principle, or a thermometer for measuring the temperature by using thermocouple and resistance temperature detector.

The power source 7 supplies operating power to the analog switch 3, the communication circuit 4, the control unit 5, and the measuring unit 6, and is constituted from, for example, a primary battery, a secondary battery, or a solar battery. Due to the need to reduce replacement frequency (maintenance frequency), it is preferable that the primary or secondary battery used as the power source 7 has a very long life. When a solar battery is used as the power source 7, some of the power generated during the daytime must be stored for use at night (since the solar battery cannot generate power at night), and it is therefore preferable that the solar battery has extremely high generating efficiency. The power source 7 can be configured (arranged) outside the wireless field device R (field device with relay function) in a single body with, or separate from, the wireless field device R, the power being supplied to the wireless field device R via a power supply cable. A solar battery is one type of eco power-generation (eco-battery), and, in addition to sunlight, the eco-battery can be one that generates power by converting energy such as vibrations, heat, wind power, and pressure into electrical power.

While, like the wireless field device R (field device with relay function), the other wireless field devices A to C (field devices without relay function) and the system management device D include hopping tables, they are configured by connecting single directional antennas a1 to d1 directly to the communication circuit 4.

As shown in FIG. 1, the directional antenna a1 of the wireless field device A and the directional antenna b1 of the wireless field device B have the left and right directions as their specific directions so that they can perform wireless communication with the wireless field device R. Similarly, the directional antenna c1 of the wireless field device C and the directional antenna d1 of the system management device D have the left and right directions as their specific directions so that they can perform wireless communication with the wireless field device R.

(Method of Constructing Wireless Measurement System)

Subsequently, a method of constructing the wireless measurement system K1 shown in FIG. 1 will be explained. Let us assume that, in an initial state, the wireless network N1 of FIG. 1 is not yet formed. Firstly, the system manager or the like manipulates the terminal device E and sets the information that the system management device D needs to create the various tables and superframes described above. The information set by the manipulation of the terminal device E (information that the system management device D needs to create the various tables and superframes described above) includes the follows types of information (1) to (4).

(1) Device Numbers

Numbers for identifying the wireless field devices A to C and R etc.

(2) Tag Names

Tags for identifying the wireless field devices A to C and R etc.

(3) EUI64

Codes for identifying the wireless field devices A to C and R etc.

(4) Device Number for Each Antenna

Numbers for identifying the wireless field device and the like that becomes the communication partners of each antenna provided in the wireless field devices A to C and R etc.

When constructing the wireless measurement system K1 shown in FIG. 1, the information shown in FIG. 8 is set as the information (4). In FIG. 8, the device numbers of the wireless field devices A to C are '1' to '3', and the device number of the wireless field device R is '4'. The device number of the system management device D is '5'.

The wireless field devices A to C and the system management device D respectively include the single directional antennas a1 to d1, and specific directions of these antennas are set such that they can perform wireless communication with the wireless field device R. Accordingly, the information '4' for each of the single directional antennas a1 to d1 of the wireless field devices A to C and the system management device D (corresponding to the first antenna in FIG. 8) is set to device number '4', which identifies the wireless field device R.

In contrast, the wireless field device R includes the first and second directional antennas 1 and 2, the specific direction of the first directional antenna 1 being set so that it can perform wireless communication with the wireless field devices A and B, and the specific direction of the second directional antenna 2 being set so that it can perform wireless communication with the wireless field device C and the system management device D. Accordingly, the information '4' for the first directional antenna 1 of the wireless field device R is set to device numbers '1' and '2', which identify the wireless field devices A and B, while the information '4' for the second directional antenna 2 is set to device numbers '3' and '5', which identify the wireless field device C and the system management device D.

Subsequently, the information set at the terminal device E is acquired (downloaded) by the system management device D, and, based on the information downloaded from the terminal device E, a process is performed in the system management device D to create the various tables and superframes described above. For example, for the wireless field device R, the link table shown in FIG. 4 is created. To simplify the explanation, in this example, the superframe used in transmitting the advertisement packet of FIG. 7 is also created.

If the power of the wireless field device R is turned on in a state where the process described above has ended and the advertisement packet is being regularly transmitted from the system management device D, the process of allowing the wireless field device R to join the wireless network N1 is performed using a conventional method. That is, the request to join the wireless network N1 is sent from the wireless field device R to the system management device D that is transmitting the advertisement packet, and, when the system management device D determines that the wireless field device R can join the wireless network N1, the wireless field device R that made the join request is allowed to join the wireless network N1.

When the wireless field device R completes the process of joining the wireless network N1, it then acquires (downloads) the control information described above (hopping table, link table, neighbor table, and superframe) from the system management device D. The wireless field device R acquires (downloads) the superframe used in transmitting the advertisement packet shown in FIG. 7 from the system management device D.

The wireless field device R that has joined the wireless network N1 then performs a process of transmitting the advertisement packet, using the superframe it acquired from the system management device D (the superframe shown in FIG. 7). Specifically, when the control unit 5 of the wireless field device R transmits an advertisement packet containing the information for 'join link 1', it controls the analog switch 3 to select the first directional antenna 1 and controls the communication circuit 4 to make the transmission. In contrast, when the control unit 5 transmits an advertisement packet containing the information for 'join link 2' of FIG. 7, it controls the analog switch 3 to select the second directional antenna 2 and then controls the communication circuit 4 to make the transmission. In this way, with the time slots as a reference, different types of advertisement packets for each of the first and second directional antennas 1 and 2 are transmitted while switching the antennas 1 and 2 (advertisement transmission step).

If the power of the wireless field device A is turned on while the advertisement packets (different types of advertisements for each of the first and second directional antennas 1 and 2) are being transmitted from the wireless field device R, a process if perform of allowing the wireless field device A to join the wireless network N1. Specifically, a join request from the wireless field device A is transmitted to the system management device D using the join link contained in the advertisement packet transmitted from the wireless field device R (join link 1' in FIG. 7).

The join request from the wireless field device A is transmitted via the wireless field device R to the system management device D, which determines whether the wireless field device A that made the join request can join the wireless network N1. When the system management device D determines that the wireless field device A can join the wireless network N1, it transmits a permission notification via the wireless field device R to the wireless field device A, thereby completing the process of joining the wireless network N1. When the process of joining the wireless network N1 is complete, the wireless field device A acquires (downloads) only the hopping table from the wireless field device R. After the wireless field device A has completed the process of joining the wireless network N1, the first directional antenna 1 switches the first and second directional antennas 1 and 2 while performing wireless communication with the wireless field device A that has joined the wireless network N1 (wireless communication step).

If the power of the wireless field devices B and C is turned on while the advertisement packets (different types of advertisements for each of the first and second directional antennas 1 and 2) are being transmitted from the wireless field device R, a process of allowing the wireless field devices B and C to join the wireless network N1 is performed in the same manner as for the wireless field device A. The join requests from the wireless field devices B and C are transmitted to the system management device D using the join link contained in the advertisement packets (join link 2' in FIG. 7). Thus the wireless network N1 shown in FIG. 1 is created and the wireless measurement system K1 is constructed.

There are cases where system manager updates the control information registered in the system management device D after the wireless measurement system K1 has been constructed, e.g. when a new wireless field device is added or when an operational wireless field device stops operating. Considering such cases, when the control information in the system management device D is updated, the system management device D notifies the wireless field device R, which can communicate directly with the system management device D, that the control information has been updated, and makes the wireless field device R download the updated control information. When the wireless field device R downloads such updated control information from the system management device D, it notifies the wireless field devices A to C that the control information has been updated, and makes them download the updated control information. In this way, all the wireless field devices constituting the wireless measurement system K1 can share the latest control information.

(Operation of Wireless Measurement System)

Subsequently, an operation of the wireless measurement system K1 having the above configuration will be explained.

While the wireless measurement system K1 performs wireless communication compliant with the ISA100.11a standard by using the time slots and channels stipulated in the hopping table, the follow explanation describes in detail an example of multi-hopping communication realized by combining the hopping table with one of a link table, a neighbor table, or a superframe.

For example, when the wireless field device A transmits measurement data to the system management device D, the wireless field device A radiates a transmission wave containing at least the measurement data, a transmission source, and a transmission destination as transmission information from the opposing directional antenna a1 to the first directional antenna 1 of the wireless field device R. As shown in the hopping table (see FIG. 3), this transmission wave is transmitted to the wireless field device R in time slot 1 and on channel 7.

This transmission wave is captured with sufficient reception sensitivity by the first directional antenna 1, which has the direction of the directional antenna a1 of the wireless field device A as its specific direction (reception direction). The control unit 5 of the wireless field device R, which uses the same hopping table as the wireless field device A, refers to the hopping table and the link table, and thereby outputs to the analog switch 3 a selection signal specifying selection of the first directional antenna 1 at the transmission timing of the communication link (A→R) from the wireless field device A to the wireless field device R (antenna selection step). As a result, the reception signal from the wireless field device A passes from the first directional antenna 1, through the analog switch 3, and is input to the communication circuit 4, where it is subjected to a reception process, and reception information is then input to the control unit 5 (communication step).

When the control unit 5 determines, based on the reception information, that the transmission destination of the reception signal is the system management device D, it refers to the hopping table, and uses time slot 2 and channel 8 allocated to the communication link (R→D) from the wireless field device R to the system management device D to transmit the transmission information of the wireless field device A to the system management device D. In this case, the control unit 5 refers to the link table, and thereby outputs a selection signal specifying selection of the second directional antenna 2 at the transmission timing of the communication link (R→D) to the analog switch 3 (antenna selection step). As a result, the transmission signal of the communication link (R→D) is supplied from the communication circuit 4, through the analog switch 3, and to the second directional antenna 2, which transmits it to the system management device D as a transmission wave (communication step).

That is, according to the wireless measurement system K1, the control unit 5 refers to the hopping table and the link table, and thereby automatically selects the first directional antenna 1 for the communication link (A→R) or the second directional antenna 2 for the communication link (R→D). Therefore, according to the wireless measurement system K1, it is possible to achieve long-distance communication using, in addition to the first and second directional antennas 1 and 2, multi-hop communication using wireless communication on the communication link (A→R) as a first hop, and wireless communication on the communication link (R→D) as a second hop.

Since the analog switch 3 switches between the first directional antenna 1 and the second directional antenna 2, the communication circuit 4 is not provided separately for the first directional antenna 1 and the second directional antenna 2, and it is therefore possible to achieve multi-hop communication that greatly suppresses a rise in the cost of the wireless field device R and a rise in energy consumption.

This type of multi-hop communication can also be achieved using a neighbor table instead of a link table. When the wireless field device A is the communication partner, the control unit 5 refers to the neighbor table, and thereby automatically selects the first directional antenna 1 allocated to the neighbor table corresponding to the wireless field device A. When the system management device D is the communication partner, the control unit 5 refers to the neighbor table, and thereby automatically selects the second directional antenna 2 allocated to the neighbor table corresponding to the system management device D. As a result, it is possible to achieve long-distance communication using, in addition to the first and second directional antennas 1 and 2, multi-hop communication that suppresses a rise in the cost of the wireless field device R and a rise in energy consumption.

Moreover, this type of multi-hop communication can also be achieved using a superframe instead of the link table and the neighbor table. That is, the control unit 5 automatically selects the first directional antenna 1 or the second directional antenna 2 in accordance with a superframe selected from a plurality of superframes. As a result, it is possible to achieve long-distance communication using, in addition to the first and second directional antennas 1 and 2, multi-hop communication that suppresses a rise in the cost of the wireless field device R and a rise in energy consumption.

(First Modification of Wireless Field Device R)

Figure 9:
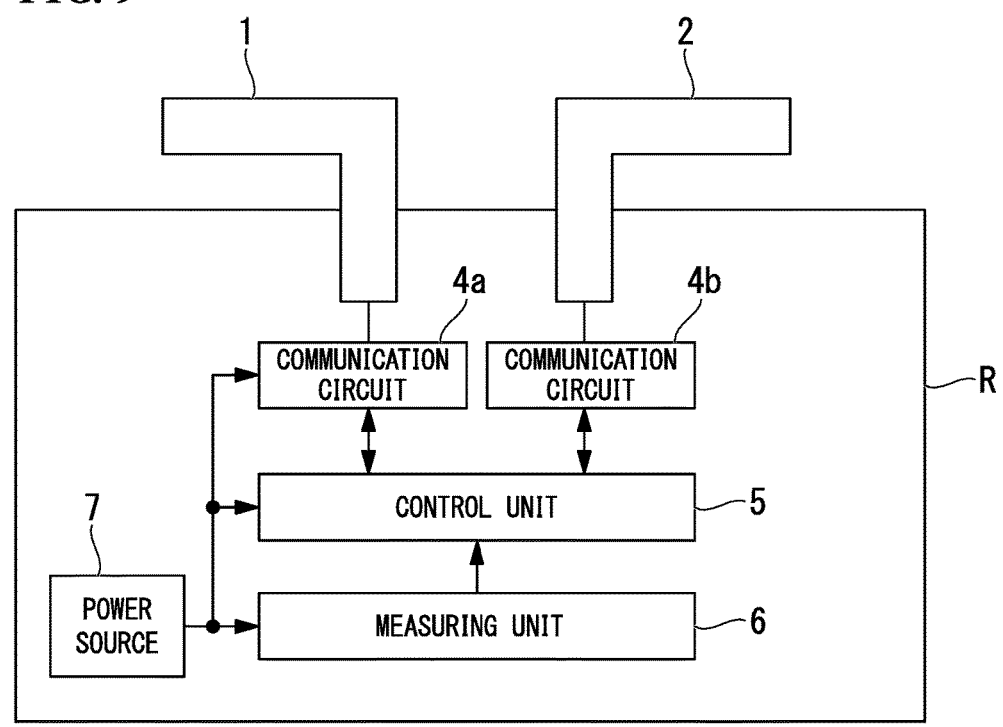
FIG. 9 is a block diagram illustrating a first modification of the wireless field device R (communication device) in accordance with the first preferred embodiment of the present invention.

Subsequently, a first modification of the wireless field device R will be explained with reference to FIG. 9. The wireless field device R shown in FIG. 9 is configured from two communication circuits (communication circuits 4a and 4b), and does not include the analog switch 3 of FIG. 2. The communication circuits 4a and 4b are similar to the communication circuit 4 of FIG. 2. The control unit 5 separately controls whether to operate them.

That is, the wireless field device R shown in FIG. 2 includes one communication circuit 4 for the first and second directional antennas 1 and 2, the antenna for use in wireless communication being allocated by the control unit 5 controlling the analog switch 3 with the time slot as a reference, and connecting one of the first and second directional antennas 1 and 2 to the communication circuit 4. In contrast, the wireless field device R shown in FIG. 9 includes the communication circuits 4a and 4b for the first and second directional antennas 1 and 2 respectively, the antenna for use in wireless communication being allocated by the control unit 5 separately controlling whether to operate the communication circuits 4a and 4b with the time slot as a reference.

The control unit 5 of the wireless field device R shown in FIG. 9 uses the control information described above (hopping table, link table, neighbor table, and superframe) to separately control whether to operate the communication circuits 4a and 4b. Consequently, the antenna allocation and communication circuit allocation performed by the wireless field device R shown in FIG. 9 is basically similar to the antenna allocation performed by the wireless field device R shown in FIG. 2.

However, by simultaneously operating the communication circuits 4a and 4b, the wireless field device R shown in FIG. 9 can simultaneously perform wireless communication using the first directional antenna 1 and wireless communication using the second directional antenna 2. It is therefore capable of simultaneously receiving different wireless signals arriving from different directions (e.g. wireless signals from the wireless field devices A and C), and of simultaneously transmitting different wireless signals destined for different directions (e.g. wireless signals to the wireless field devices A and C). Furthermore, it can receive a wireless signal using one of the first and second directional antennas 1 and 2, while simultaneously transmitting a wireless signal using the other of the first and second directional antennas 1 and 2.

(Second Modification of Wireless Field Device R)

Subsequently, a second modification of the wireless field device R will be explained with reference to 10. The wireless field device R shown in FIG. 10 combines the wireless field device R shown in FIG. 2 and the wireless field device R shown in FIG. 9. That is, it combines a configuration S1, in which one communication circuit 4 is provided for a plurality of antennas 11 to 13 containing directional antennas, and the control unit 5 connects one of the antennas 11 to 13 to the communication circuit 4 controlling the analog switch 3 with the time slot as a reference, and a configuration S2, in which communication circuits 4a and 4b are provided respectively for a plurality of antennas 21 and 22 containing directional antennas, and the control unit 5 separately controls whether to operate the communication circuits 4a and 4b with the time slot as a reference.

Figure 10:
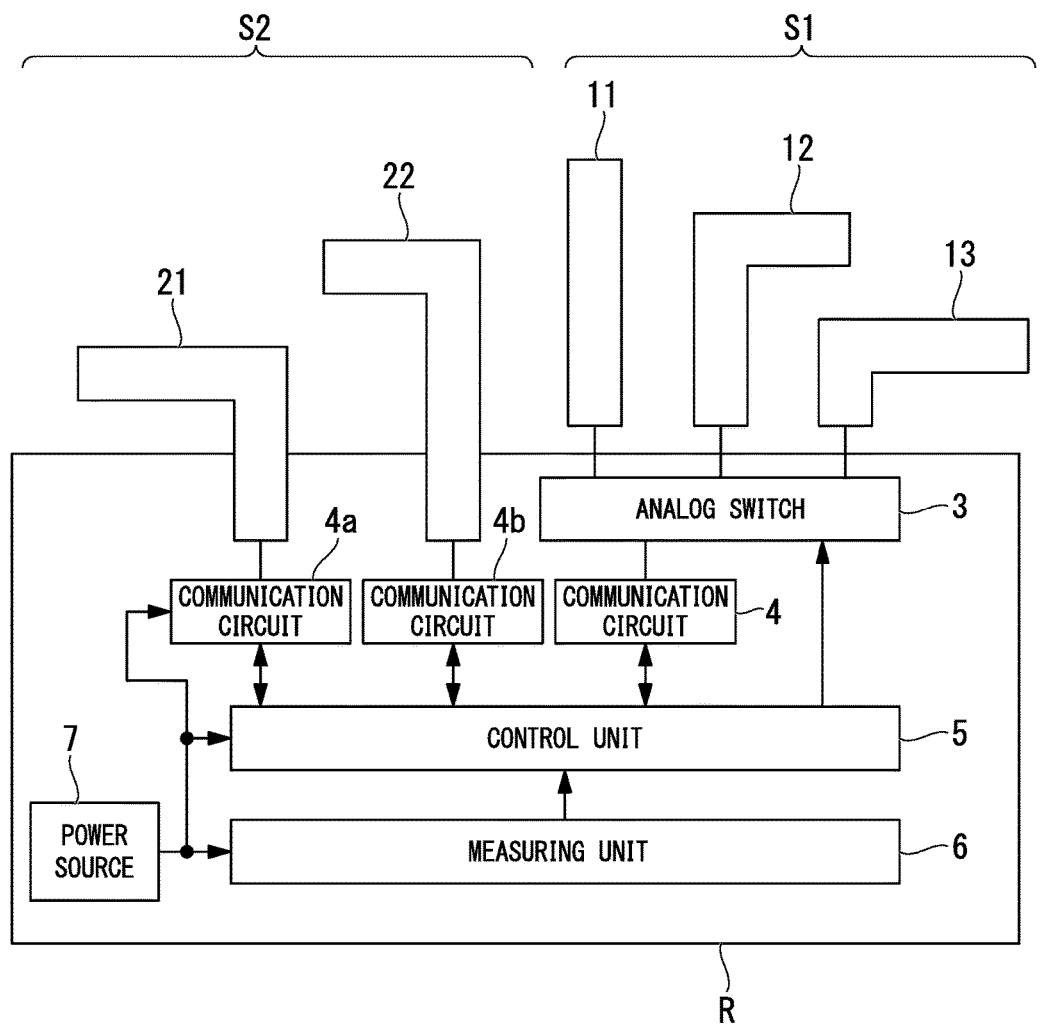
FIG. 10 is a block diagram illustrating a second modification of the wireless field device R (communication device) in accordance with the first preferred embodiment of the present invention.

The wireless field device R shown in FIG. 10 allocates the antennas and communication circuits by a method similar to that whereby the wireless field devices R shown in FIG. 2 and FIG. 9 allocate antennas. The configuration shown in FIG. 10 can obtain the advantages of both the wireless field devices R shown in FIG. 2 and FIG. 9.

Second Preferred Embodiment

Subsequently, a wireless measurement system K2 in accordance with a second preferred embodiment will be explained with reference to FIG. 11. The wireless measurement system K2 is provided on various types of pipelines, and includes wireless field devices A, R1, and R2 and a system management device D arranged in substantially straight lines along the pipelines. In a pipeline for supplying a fluid such as oil or natural gas from a supply area to an area of demand, the fluid pressure must be measured at intervals of a fixed distance (e.g. 2 km).

The wireless measurement system K2 is a measurement facility for measuring fluid pressure in that way, and is provided on the pipeline in this order: a wireless field device A, a wireless field device R1, a wireless field device R2, and a system management device D. Of these devices, the wireless field device A and the system management device D are exactly the same as the wireless field device A and the system management device D of the first preferred embodiment, and are therefore designated with the same reference numerals. While the two wireless field devices R1 and R2 have different reference numerals to those of the wireless field device R (field device with relay function) of the first preferred embodiment, functionally they are the exactly same.

In this wireless measurement system K2, measurement data of the wireless field device A is transmitted to the wireless field device R1 by wireless communication (first hop). The wireless field device R1 refers to a route table, and transmits the measurement data from the wireless field device A, together with its own measurement data, to the wireless field device R2 (second hop) by wireless communication. The wireless field device R2 transmits the measurement data of the wireless field device A and the wireless field device R1 it received from the wireless field device R1, together with its own measurement data, to the system management device D by wireless communication (third hop).

Since the two wireless field devices R1 and R2 having relay functions are provided in series between the wireless field device A and the system management device D, multi-hop communication can be accomplished over a longer transmission distance than the preferred embodiment described earlier. Furthermore, since the wireless field devices R1 and R2 not only transfer measurement data from the wireless field device A but can also transmit their own measurement data, various types of communications can be accomplished. The number (stages) of the wireless field devices R1 and R2 is not limited to two, and the transmission distance can be further increased by providing three or more field devices with relay function.

The wireless measurement system K2 of the second preferred embodiment can be constructed using basically the same method as for the wireless measurement system K1 of the first preferred embodiment. However, since the wireless field devices A, R1, and R2 and the system management device D of the wireless measurement system K2 are arranged substantially in a straight line, it is necessary first to allow the wireless field device R2 join the wireless network (not shown in FIG. 11), then to allow the wireless field device R1 join the wireless network, and lastly to allow the wireless field device A join the wireless network.

Figure 11:
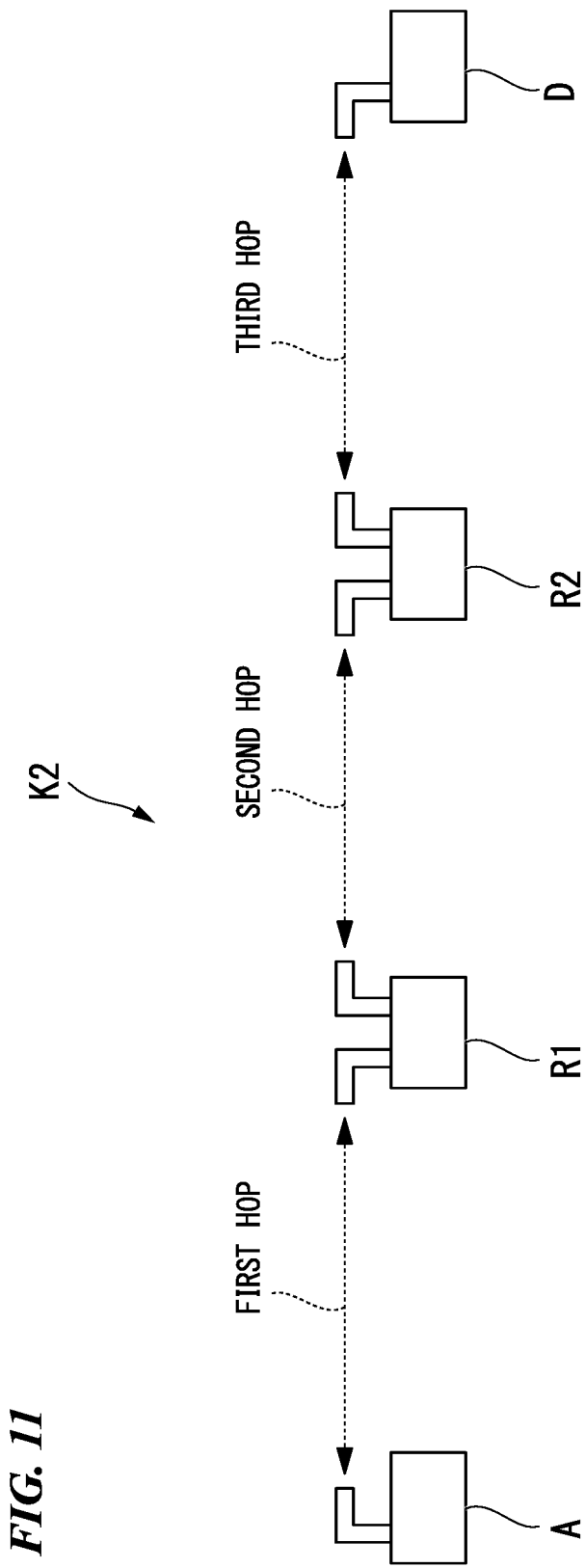
FIG. 11 is a system configuration diagram illustrating a wireless measurement system K2 (communication system) in accordance with a second preferred embodiment of the present invention.

When constructing the wireless measurement system K2 shown in FIG. 11, a wireless field device that newly joins the wireless network is arranged on the left side of FIG. 11 with respect to the wireless field devices that already belong. For example, if we suppose that the wireless field device R2 already belongs to the wireless network and the wireless field device R1 newly joins, the wireless field device R1 is arranged on the left side of the wireless field device R2. Thus the wireless field devices R1 and R2 need only transmit advertisement packets to their own left side, and do not always need to transmit different types of advertisement packets for each antenna as in the first preferred embodiment.

In the second preferred embodiment, the wireless field device R in accordance with first and second modifications of the first preferred embodiment described above (the wireless field device R including the plurality of communication circuits 4a and 4b) can be used as the wireless field devices R1 and R2. By making the plurality of communication circuits 4a and 4b operate simultaneously, it thus becomes possible to simultaneously perform wireless communication using the first directional antenna 1 and wireless communication using the second directional antenna 2.

Third Preferred Embodiment

Figure 12:
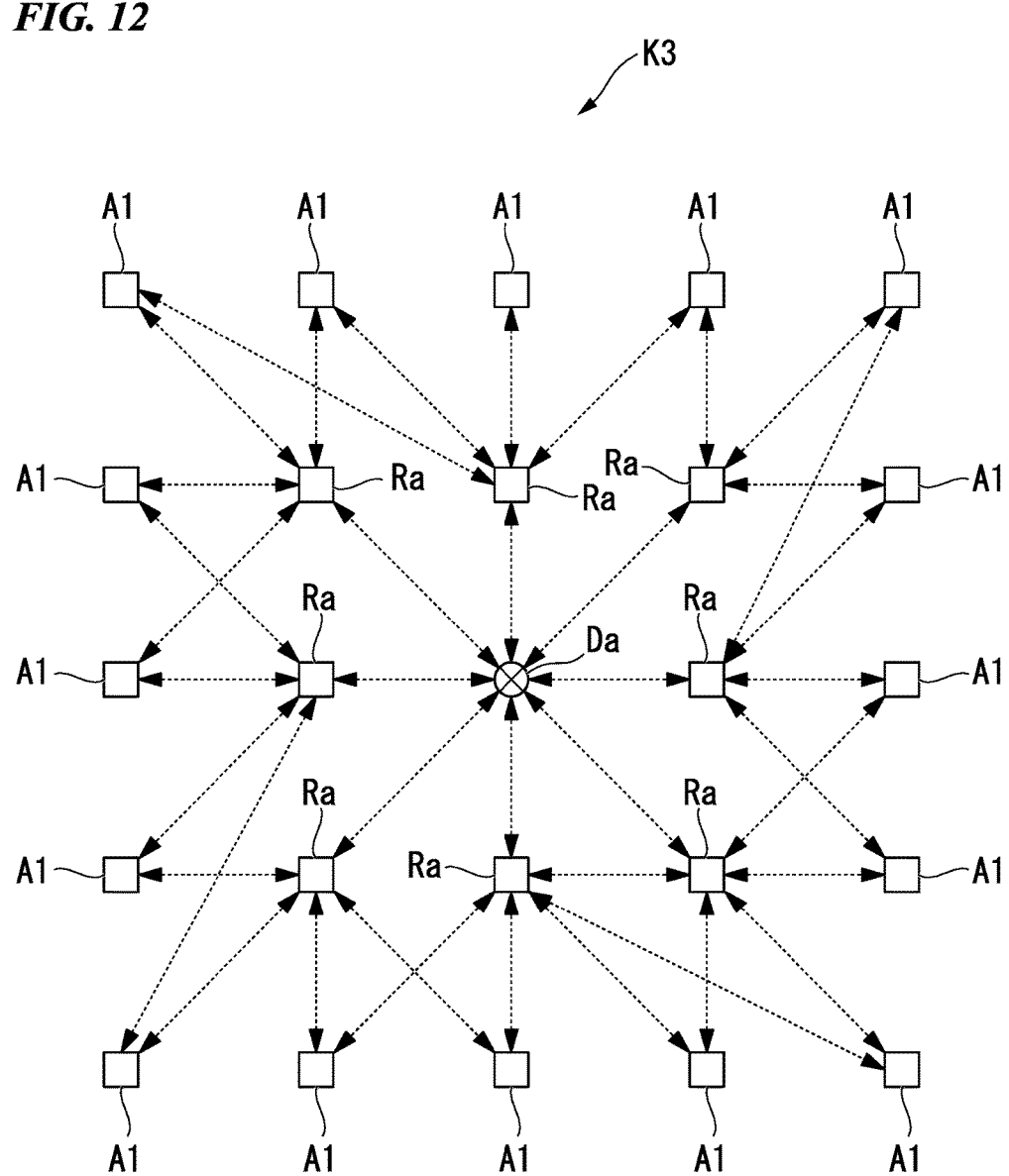
FIG. 12 is a system configuration diagram illustrating a wireless measurement system K3 (communication system) in accordance with a third preferred embodiment of the present invention.

Subsequently, a wireless measurement system K3 and a wireless field device Ra in accordance with a third preferred embodiment of the invention will be explained with reference to FIGS. 12 to 14. The wireless measurement system K3 is provided at, for example, an oil field, and, as shown in FIG. 12, includes sixteen wireless field devices A1, eight wireless field devices with relay function Ra, and a system management device Da, which are provided vertically and horizontally in an orthogonal arrangement with a fixed distance between them.

In this wireless measurement system K3, the system management device Da is at the center with the eight wireless field devices Ra arranged in eight directions around it (above, below, left, right, and at 45-degree diagonals) with gaps of, for example, 1 km to 2 km between them, and the wireless field devices A1 are arranged on the outer sides of the wireless field devices Ra (the directions to the left side, upper side, right side, lower side, and 45-degree diagonals) with gaps of, for example, 1 km to 2 km between them. These wireless field devices A1 and the wireless field devices Ra are provided at the wellheads of the oil field, which are similarly arranged orthogonally.

Figure 13:
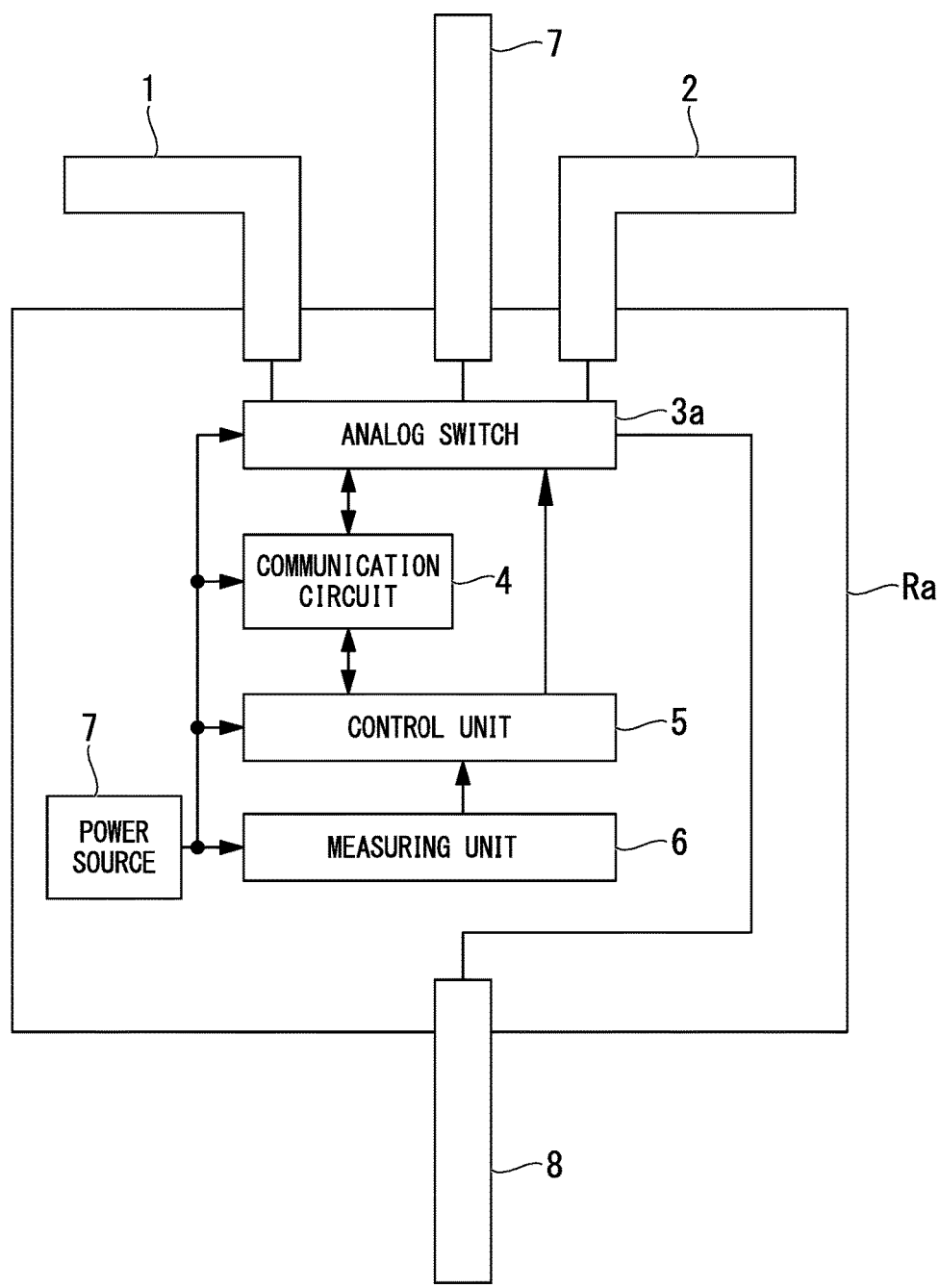
FIG. 13 is a block diagram illustrating a functional configuration of a wireless field device Ra (communication device) in accordance with the third preferred embodiment of the present invention.

As shown in FIG. 13, the wireless field device Ra (field device with relay function) used in the wireless measurement system K3 is configured by adding a high-gain omni-directional antenna for long-distance communication 7 and a omnidirectional antenna for coverage area 8 to the wireless field device R (field device with relay function) of the preferred embodiments described above, and, in accordance with those additions, altering the analog switch 3 of the first preferred embodiment (which includes two selection terminals) to an analog switch 3a including four selection terminals. Aside from these differences, the wireless measurement system K3 is similar to the wireless field device R.

Figure 14:
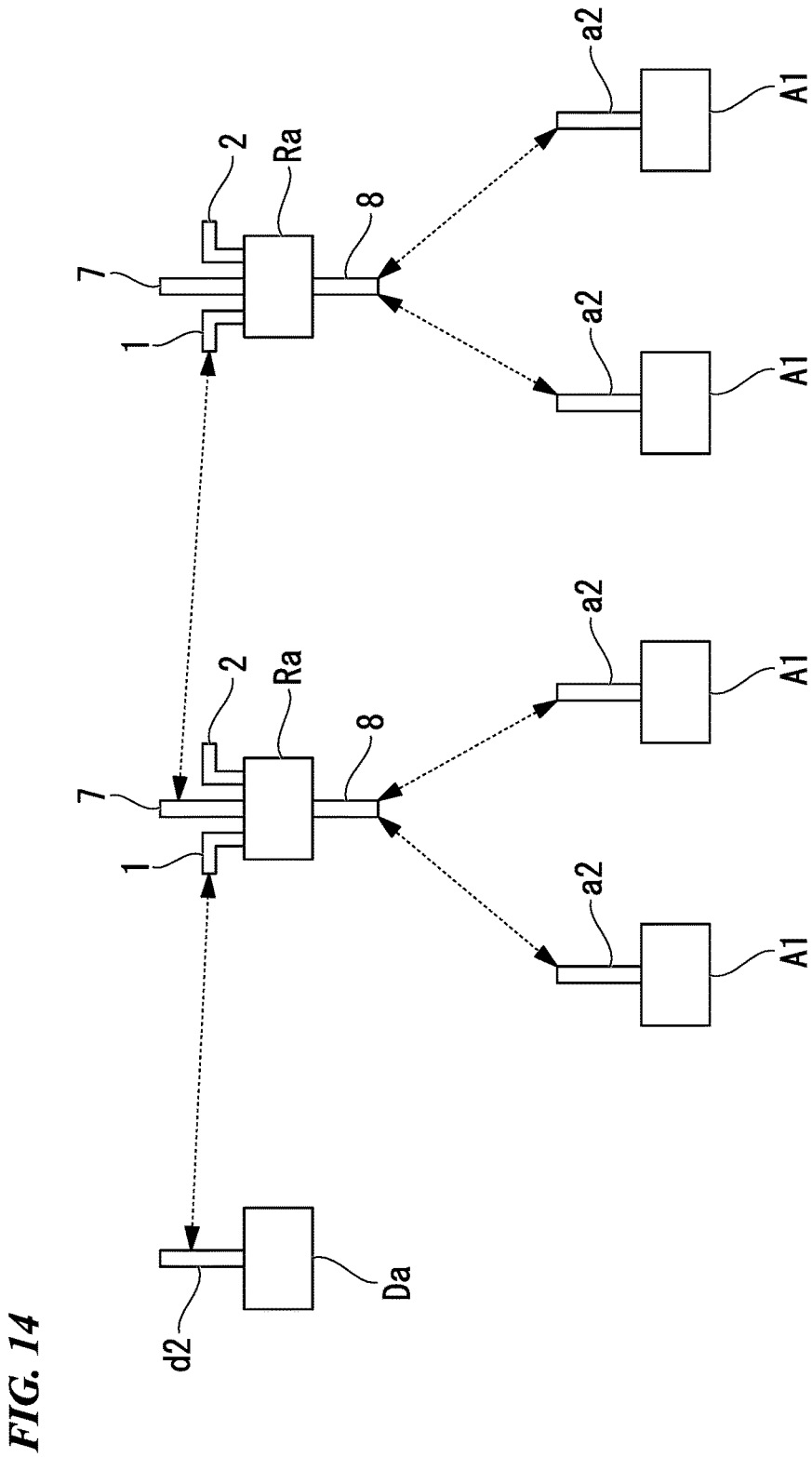
FIG. 14 is a system configuration diagram illustrating a part of a wireless measurement system K3 in accordance with the third preferred embodiment of the present invention.

As shown in FIG. 14, the wireless field device A1 is configured by replacing the first directional antenna 1 in the wireless field device A of the preferred embodiments described above with an omnidirectional antenna for coverage area a2. The system management device Da is configured by replacing the directional antenna d1 in the system management device D of the preferred embodiments described above with a high-gain omnidirectional antenna for long-distance communication d2.

As shown in FIG. 14, each wireless field device Ra in the wireless measurement system K3 uses the omnidirectional antenna for coverage area 8 to perform wireless communication with the wireless field devices A1. In performing wireless communication with a neighboring wireless field device Ra, the wireless field device Ra uses the first directional antenna 1 for transmission, and uses the high-gain omnidirectional antenna for long-distance communication 7 or the second directional antenna 2 for reception.

To discriminately use the first and second directional antennas 1 and 2, and the high-gain omnidirectional antenna for long-distance communication 7 or the omnidirectional antenna for coverage area 8, the control unit 5 uses a link table or a neighbor table and the hopping table provided for the wireless measurement system K3 and creates a switch signal, which is then supplied to the analog switch 3a. The wireless measurement system K3 of the third preferred embodiment can be constructed by a method that is basically similar to that for the wireless measurement system K1.

According to the wireless measurement system K3, the first and second directional antennas 1 and 2, the high-gain omnidirectional antenna for long-distance communication 7, and the omnidirectional antenna for coverage area 8 are switched at the analog switch 3a by using a link table or a neighbor table and the hopping table, thereby making it possible to suppress a rise in the cost of the wireless field device Ra and a rise in energy consumption; in addition, it is possible to accomplish long-distance communication using various types of multi-hop communications that combine the first and second directional antennas 1 and 2 with the high-gain omnidirectional antenna for long-distance communication 7 and the omnidirectional antenna for coverage area 8.

As with the wireless field device R in accordance with the first and second modifications of the first preferred embodiment described above, the wireless field device Ra used in the third preferred embodiment can be configured without the analog switch 3a and with a communication circuit provide for each antenna. By making a plurality of communication circuits operate simultaneously, it is possible to perform simultaneous wireless communication using at least two antennas from among the first and second directional antennas 1 and 2, the high-gain omnidirectional antenna for long-distance communication 7, and the omnidirectional antenna for coverage area 8.

The present invention is not limited to the preferred embodiments described above. For example, the following modifications are conceivable:

(1) While the preferred embodiments and modifications described above apply the invention in wireless measurement, the invention is not limited to this application. The invention can be applied in various types of applications other than wireless measurement.

(2) While the preferred embodiments and modifications described above switch the antennas by combining a hopping table with a link table, a neighbor table, or a superframe, the invention is not limited to this. For example, where necessary, the antennas can be switched by dynamically switching the link table, the neighbor table, or the superframe and combining them with the hopping table.

(3) While the preferred embodiments and modifications described above relate to a wireless field device including the measuring unit 6, in addition to a wireless field device including the measuring unit 6 for measuring various process quantities, there is a wireless field device that includes an manipulation unit (manipulation unit), such as a valve positioner or a valve, for adjusting the valve aperture and manipulating the process quantities and the like.

The present invention can also be applied in a wireless field device that includes such a manipulation unit (manipulation unit). Such a wireless field device wireless receives manipulation data used at the manipulation unit from the communication partners.

(4) While the preferred embodiments and modifications described above apply the invention in wireless communication compliant with ISA100.11a, the invention is not limited to this. For example, the invention can also be applied in wireless communication compliant with WirelessHART (Registered Trademark).

INDUSTRIAL APPLICABILITY

The present invention can be widely applied to communication device, a communication system, and a communication method, and makes it possible to achieve long-distance communication and various types of communication, while greatly suppressing a rise in cost.

DESCRIPTION OF THE REFERENCE SYMBOLS 1 first directional antenna
2 second directional antenna
3 analog switch (selection circuit)
3a analog switch (selection circuit)
4 communication circuit
4a communication circuit
4b communication circuit
5 control unit
6 measuring unit
7 power source
8 omnidirectional antenna
11 antenna
12 antenna
13 antenna
21 antenna
22 antenna
A wireless field device
A1 wireless field device
B wireless field device
C wireless field device
D system management device
Da system management device
E terminal device
K1 wireless measurement system (communication system)
K2 wireless measurement system (communication system)
K3 wireless measurement system (communication system)
N1 wireless network
N2 wired network
R wireless field device (field device with relay function, communication device)
Ra wireless field device (field device with relay function, communication device)
R1 wireless field device (field device with relay function, communication device)
R2 wireless field device (field device with relay function, communication device)
S1 configuration
S2 configuration
a1 directional antenna
b1 directional antenna
c1 directional antenna
d1 directional antenna

The invention claimed is:

1. A communication system comprising:
a system management device configured to communicate with a terminal device, the system management device being configured to create at least one hopping table that specifies time slots, frequency channels, and multi-hop wireless communication links for multi-hop wireless communication, based on information set by the terminal device;
a first wireless field device configured to perform at least one of measuring at least a specific physical quantity and manipulating the at least a specific physical quantity, the first wireless field device comprising a first directional antenna, the first wireless field device comprising a first control unit configured to acquire the at least one hopping table from the system management device and store the at one least hopping table and to select the first directional antenna for a first communication link based on the time slots, the frequency channels, and the multi-hop wireless communication links specified by the at least one hopping table; and
a second wireless field device as a relay station for a multi-hop wireless communication based on the time slots, the frequency channels, and the multi-hop wireless communication links specified by the at least one hopping table between the first wireless field device and the system management device, the second wireless field device as the relay station configured to perform at least one of measuring at least a specific physical quantity and manipulating the at least a specific physical quantity, the second wireless field device comprising a second directional antenna which is directed toward the system management device, and a third directional antenna which is directed toward the first wireless field device, and the second wireless field device comprising a second control unit configured to acquire the at least one hopping table from the system management device and store the at least one hopping table and to select the second directional antenna for a second communication link and the third directional antenna for a third communication link based on the time slots, the frequency channels, and the multi-hop wireless communication links specified by the at least one hopping table to allow the multi-hop wireless communication between the first wireless field device and the system management device for performing at least one of transmitting data of the measured at least specific physical quantity from the first wireless field device through the second wireless field device to the system management device and transmitting manipulation data for manipulating the at least a specific physical quantity from the system management device through the second wireless field device to the first wireless field device.

2. The communication system according to claim 1,
wherein the system management device is configured to create a plurality of super-frames respectively allocated with different priorities, and
wherein each of the first and second control units is configured to refer to the plurality of super-frames and use the multi-hop wireless communication link which has the super-frame allocated with the highest priority if there is any interference between the multi-hop wireless communication links.

3. The communication system according to claim 1,
wherein the system management device is configured to create, in addition to the hopping table, a link table that stipulates at least the second and third directional antennas of the second field device as the relay station for each multi-hop wireless communication link with which the second wireless field device engages, and
wherein each of the first and second control units is configured to acquire the link table from the system management device and store the link table.

4. The communication system according to claim 1,
wherein the system management device is configured to create, in addition to the hopping table, a neighbor table that stipulates at least the second and third directional antennas of the second field device as the relay station for each multi-hop wireless communication link with which the second wireless field device engages, and
wherein each of the first and second control units is configured to acquire the neighbor table from the system management device and store the neighbor table.

5. The communication system according to claim 1,
wherein the system management device comprises a fourth directional antenna which is directed toward the second wireless field device as the relay station.

6. The communication system according to claim 1,
wherein the system management device comprises a first non-directional antenna for wirelessly communicating with the second wireless field device as the relay station.

7. The communication system according to claim 1, further comprising:
a third wireless field device configured to perform at least one of measuring at least a specific physical quantity and manipulating the at least a specific physical quantity, the third wireless field device comprising a second non-directional antenna, and
wherein the second wireless field device comprises, in addition to the first and second directional antennas, a third non-directional antenna configured to wirelessly communicate with the third wireless field device.

8. The communication system according to claim 1, further comprising:
a fourth wireless field device configured to perform at least one of measuring at least a specific physical quantity and manipulating the at least a specific physical quantity, the fourth wireless field device comprising a fourth directional antenna, the fourth wireless field device comprising a fourth control unit configured to acquire the at least one hopping table from the system management device and store the at least one hopping table and to select the fourth directional antenna for a fourth communication link based on the time slots, the frequency channels, and the multi-hop wireless communication links specified by the at least one hopping table; and
wherein the second wireless field device as the relay station is configured to communicate wirelessly through the first directional antenna to both the first field device and fourth wireless field device.

9. The communication system according to claim 1, further comprising:
a fifth wireless field device configured to perform at least one of measuring at least a specific physical quantity and manipulating the at least a specific physical quantity, the fifth wireless field device comprising a fifth directional antenna, the fifth wireless field device comprising a fifth control unit configured to acquire the at least one hopping table from the system management device and store the at least one hopping table and to select the fifth directional antenna for a fifth communication link based on the time slots, the frequency channels, and the multi-hop wireless communication links specified by the at least hopping table; and
wherein the second wireless field device as the relay station is configured to communicate wirelessly through the second directional antenna to both the system management device and the fifth wireless field device.

* * * * *